(12) United States Patent
Wodjenski et al.

(10) Patent No.: US 7,018,448 B2
(45) Date of Patent: Mar. 28, 2006

(54) GAS CABINET INCLUDING INTEGRATED EFFLUENT SCRUBBER

(75) Inventors: Michael J. Wodjenski, New Milford, CT (US); Jose I. Arno, Brookfield, CT (US)

(73) Assignee: Advanced Technology Materials, Inc., Danbury, CT (US)

( * ) Notice: Subject to any disclaimer, the term of this patent is extended or adjusted under 35 U.S.C. 154(b) by 100 days.

(21) Appl. No.: 10/694,648

(22) Filed: Oct. 28, 2003

(65) Prior Publication Data

US 2005/0087072 A1 Apr. 28, 2005

(51) Int. Cl.
*B01D 53/04* (2006.01)

(52) U.S. Cl. .................. 95/116; 96/117.5; 96/130; 96/147; 96/414

(58) Field of Classification Search ............ 95/90, 95/116, 127–147; 96/108, 109, 117.5, 130, 96/147, 414
See application file for complete search history.

(56) References Cited

U.S. PATENT DOCUMENTS

| | | | | |
|---|---|---|---|---|
| 4,099,936 | A * | 7/1978 | Tarancon .................. | 95/127 |
| 5,230,721 | A * | 7/1993 | Ohmi ........................ | 55/302 |
| 5,518,528 | A | 5/1996 | Tom et al. | |
| 5,814,127 | A * | 9/1998 | Li ............................. | 95/47 |
| 5,858,065 | A * | 1/1999 | Li et al. .................... | 95/45 |
| 5,879,458 | A * | 3/1999 | Roberson et al. ......... | 118/715 |
| 6,017,382 | A * | 1/2000 | Ji et al. ..................... | 95/103 |
| 6,027,547 | A * | 2/2000 | Tom et al. ................. | 95/96 |
| 6,089,027 | A | 7/2000 | Wang et al. | |
| 6,101,816 | A | 8/2000 | Wang et al. | |
| 6,110,257 | A * | 8/2000 | Tom ........................... | 95/22 |
| 6,241,955 | B1 * | 6/2001 | Alvarez, Jr. ............... | 423/210 |
| 6,338,312 | B1 * | 1/2002 | Hayes et al. .............. | 118/723 CB |
| 6,471,747 | B1 * | 10/2002 | Venkatesh et al. ........ | 95/90 |
| 6,471,750 | B1 * | 10/2002 | Olander .................... | 95/116 |
| 2003/0192430 | A1 * | 10/2003 | Pearlstein et al. ........ | 95/90 |
| 2004/0123735 | A1 * | 7/2004 | Watanabe et al. ......... | 95/90 |
| 2004/0159235 | A1 * | 8/2004 | Marganski et al. ....... | 95/116 |
| 2004/0206237 | A1 * | 10/2004 | Sherer ........................ | 95/90 |
| 2005/0061147 | A1 * | 3/2005 | Marganski et al. ....... | 95/116 |

\* cited by examiner

*Primary Examiner*—Robert H. Spitzer
(74) *Attorney, Agent, or Firm*—Steven J. Hultquist; Intellectual Property/Technology Law; Margaret Chappuis

(57) ABSTRACT

A gas cabinet assembly for dispensing of gas to a process facility such as a semiconductor manufacturing tool. A purge gas dry scrubber is integrated with the gas flow circuitry and a venturi pump in the gas cabinet. Purge gas is flowed through the flow circuitry in the gas cabinet subsequent to on-stream dispensing of process gas through such flow circuitry, and forms a purge effluent including the residual process gas. The purge effluent is flowed through a dry scrubber unit to sorptively remove the process gas species from the purge effluent. The resultant process gas-depleted purge effluent is vented from the gas cabinet, e.g., into the ducting of the house exhaust system of the process facility. Monitoring of the relative depletion of the dry scrubbing medium in the dry scrubber may be carried out with end-point detection, e.g., using colorimetric change techniques, toxic gas monitor devices, or PLC/CPU arrangements.

20 Claims, 2 Drawing Sheets

GAS CABINET INCLUDING INTEGRATED EFFLUENT SCRUBBER

BACKGROUND OF THE INVENTION

1. Field of the Invention

This invention relates to a gas cabinet useful in semiconductor manufacturing operations, and more specifically to a gas cabinet including an integrated effluent scrubber.

2. Description of the Related Art

In semiconductor manufacturing operations, highly efficient gas sources have come into use that are employed in gas cabinets containing the gas source vessels and associated flow circuitry, as well as associated monitoring and control componentry. Such gas sources include the sources described in U.S. Pat. No. 5,518,528 issued May 21, 1996 to Glenn M. Tom, et al., U.S. Pat. No. 6,089,027 issued Jul. 18, 2000 to Luping Wang et al. and U.S. Pat. No. 6,101,816 issued Aug. 15, 2000 to Luping Wang et al. These gas sources are commercially available from ATMI, Inc. (Danbury, Conn., USA) under the trademarks SAGE and VAC.

In the use of such gas sources, an exhaust scrubber for treatment of the vent gas from the gas cabinet containing the gas source entails substantial capital equipment and operating costs. The alternative of piping the vent gas from the gas cabinet to the ducting of the house exhaust system of the semiconductor manufacturing facility avoids such expenditures, but the purging of the gas panel flow circuitry incident to changeovers of gas source vessels can cause false alarms by toxic gas monitor alarms that are arranged to detect leakage from gas source vessels and/or gas flow circuitry in the exhaust stream. Thus, neither approach (gas cabinet vent gas scrubber or vent gas piping to the house exhaust system) is satisfactory from an economic and operational perspective.

It would be a significant advance in the art to provide a gas cabinet that avoids such deficiencies.

SUMMARY OF THE INVENTION

The present invention relates to a gas cabinet useful in semiconductor manufacturing operations, which is constructed and operated to effect local scrubbing of gas in the gas cabinet, thereby minimizing vent gas abatement issues.

In one aspect, the invention relates to a gas cabinet assembly for dispensing of gas to a process facility, such gas cabinet assembly including:

a housing enclosing an interior volume configured for positioning of at least one process gas supply vessel therein;

a discharge passage for flow of dispensed process gas out of the housing;

flow circuitry in the interior volume, interconnecting the at least one gas supply vessel and the discharge passage, and arranged for flow of process gas dispensed from such gas supply vessel to the discharge passage in a first mode of operation;

a purge gas source coupled with the flow circuitry and arranged to flow purge gas through the flow circuitry to purge residual hold-up process gas from the flow circuitry in a second mode of operation subsequent to the first mode of operation, wherein the purge gas and residual hold-up process gas together form a purge effluent;

a dry scrubber unit coupled with the flow circuitry to receive the purge effluent, the dry scrubber unit including a dry scrubbing medium arranged to sorptively remove process gas from the purge effluent and yield a process gas-depleted purge effluent;

a venturi pump coupled with the dry scrubber unit to remove the process gas-depleted purge effluent from the dry scrubber unit; and an exhaust passage coupled with the venturi pump to discharge the process gas-depleted purge effluent from the housing.

In another aspect, the invention relates to a gas delivery process wherein process gas from a gas supply vessel is flowed through flow circuitry in a gas cabinet and dispensed from the gas cabinet, and the flow circuitry subsequent to process gas dispensing is purged with a purge gas to remove residual process gas from the flow circuitry and yield a purge effluent including the purge gas and residual process gas from the flow circuitry. The process includes contacting the purge effluent with a dry scrubbing medium that is effective to remove the process gas from the purge effluent and yield a process gas-depleted purge effluent, and pumping the process gas-depleted purge effluent out of the gas cabinet with a venturi pump.

Other aspects, features and embodiments of the invention will be more fully apparent from the ensuing disclosure and appended claims.

DETAILED DESCRIPTION OF THE INVENTION, AND PREFERRED EMBODIMENTS THEREOF

The present invention relates to gas cabinets useful in semiconductor manufacturing operations, which are used for dispensing of a process gas to the semiconductor manufacturing facility, e.g., to a specific process tool therein, such as an ion implanter, chemical vapor deposition chamber, etc.

In accordance with the invention, a purge gas scrubber is integrated with the gas flow circuitry in a gas cabinet. Purge gas is flowed through the flow circuitry in the gas cabinet subsequent to on-stream dispensing of process gas through such flow circuitry. The purge gas thereby displaces and entrains the residual process gas in the flow circuitry to form a purge effluent. The purge effluent is flowed through a dry scrubber unit including a scrubber medium selectively sorptive for the process gas, to sorptively remove the process gas species from the purge effluent. The resultant process gas-depleted purge effluent then may be vented from the semiconductor manufacturing facility, or it may be discharged to the house exhaust ducting of the semiconductor manufacturing facility, as appropriate.

Figure 1:
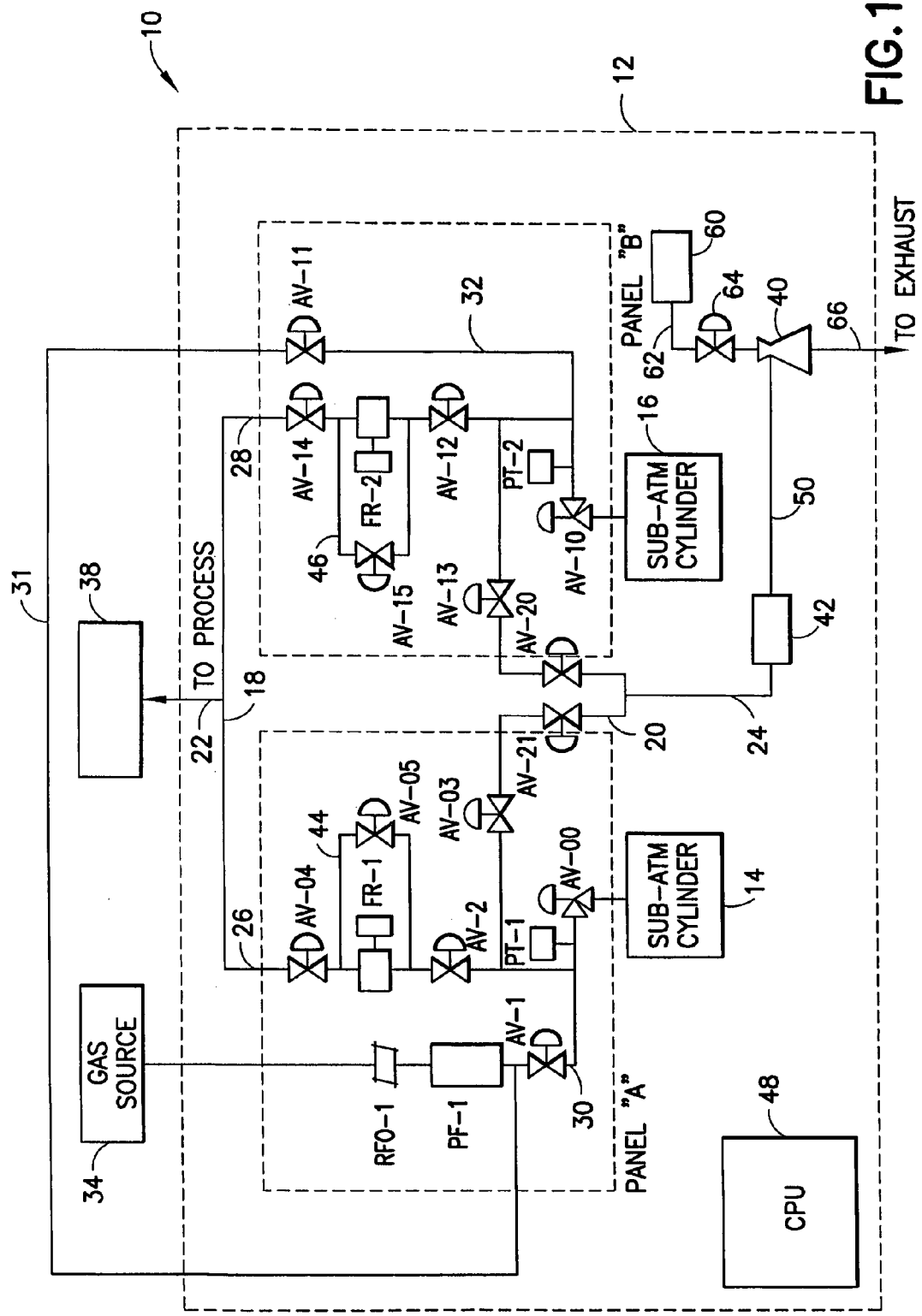
FIG. 1 is a schematic representation of a gas cabinet including an integrated scrubber in accordance with one embodiment of the invention.

Referring now to the drawings, FIG. 1 is a schematic representation of a gas delivery system 10 including a gas cabinet 12 schematically depicted in dashed line representation. The gas cabinet 12 contains an integrated scrubber 42, in accordance with an illustrative embodiment of the invention. The gas cabinet assembly includes two process gas supply vessels positioned in the interior volume of the housing of the cabinet, in the embodiment shown in FIG. 1, but the gas cabinet assembly in general includes at least one such process gas supply vessel, and may include more than two such vessels, with each vessel associated with a gas panel including gas panel flow circuitry constituting a portion of the flow circuitry in the interior volume of the gas cabinet housing, and arranged for independent dispensing operation. Each of the gas panels may be integrated with a single central processing unit (CPU), as hereinafter more fully described.

The gas cabinet 12 is shown in FIG. 1 as including two gas panel assemblies, denoted in dashed line representation as PANEL "A" and PANEL "B," each associated with a corresponding one of gas storage and dispensing vessels 14 and 16, respectively. The gas assemblies may each be deployed in a single gas cabinet enclosure, as shown. Alternatively, each of the gas panel assemblies can be deployed in its own gas cabinet, and interconnected with flow circuitry including manifolding common to both gas panel cabinets.

Regardless of the specific arrangement of the gas panels, the gas cabinet comprises a unitary structural housing defining an interior volume therewithin, as an enclosure for the componentry hereafter described. The gas cabinet may be equipped with access doors, gas supply vessel securement members, etc., as is known in the art.

The respective gas panel assemblies, "PANEL A" and "PANEL B," in the gas delivery system 10 are generally symmetrical to one another, comprising piping, valving, flow control and processing monitoring means, for gas delivery, purge and evacuation modes of operation. Each of the gas panels may be integrated with (interactively coupled to) a single central processing unit (CPU) 48.

The respective gas panel assemblies are coupled with process gas discharge manifold line 18, to which is joined the process gas discharge flow line 22. The process gas discharge flow line 22 thus constitutes a discharge passage for flow of dispensed process gas out of the housing of the gas cabinet assembly, and the discharge flow line 22 is in turn connected in process gas feed relationship to the process gas-consuming facility 38, which may for example comprise a semiconductor manufacturing tool such as an ion implanter or a chemical vapor deposition chamber, or other process unit. In the gas delivery system 10, the automatic valves are denoted by the prefix "AV-" followed by a number for the specific valve unit. Restricted flow orifice elements are employed in the system and are denoted by the prefix "RFO-" followed by the number of the specific restricted flow orifice unit. Particle filters are denoted by the prefix "PF-" followed by the number of the specific particle filter unit. Pressure transducer elements are denoted by the prefix "PT-" followed by the number of the specific pressure transducer unit. Pressure-controlled flow regulating devices are denoted by the prefix "FR-" followed by the number of the specific pressure-controlled flow-regulating device.

As illustrated, PANEL A includes a purge line 30 coupled with the purge gas source 34. The purge gas source 34 may comprise a cylinder or other supply container, or a "house" bulk purge source of purge gas for selective flow of purge gas through the purge line 30. The purge line 30 contains automatic valve AV-1, restricted flow orifice RFO-1, and an optional particle filter PF-1. The PANEL A main gas flow line 26 interconnects the process gas discharge manifold line 18 with a sub-atmospheric pressure gas supply vessel 14, as well as the purge gas manifold line 20 containing automatic valve AV-21 therein. The purge line 30 is coupled via line 31 to purge line 32 of PANEL B, so that purge gas source 34 serves both PANEL A and PANEL B.

By way of specific example, the sub-atmospheric pressure gas supply vessel 14 may comprise a sorbent-based gas storage and dispensing vessel of the type shown and described in U.S. Pat. No. 5,518,528, e.g., a "JY" cylinder containing a physical sorbent material having sorptive affinity for the gas to be dispensed, such as a bead activated carbon sorbent loaded with about 0.5 kilogram of arsine gas. Alternatively, the gas supply vessel 14 can be a vessel containing a high pressure fluid and an interiorly disposed gas flow regulator, as described in U.S. Pat. No. 6,089,027 to Wang et al. or U.S. Pat. No. 6,101,816 to Wang et al.

In the gas dispensing mode, arsine gas is flowed from the supply vessel 14 through the main gas flow line 26, the process gas discharge manifold line 18 and the process gas discharge flow line 22 to the gas-consuming facility 38, which may comprise a CVD tool, e.g., for the deposition and incorporation of arsenic and phosphorus atoms in thin film substrates used in the manufacture of microelectronic device structures.

The main gas flow line 26 is coupled to the supply vessel 14 by a valve head assembly including a valve AV-00. The main gas flow line 26 contains a pressure transducer PT-1, automatic valve AV-2, pressure-controlled flow regulating device FR-1, and automatic valve AV-04, and such line 26 is coupled with optional by-pass flow control loop 44 containing automatic valve AV-05.

PANEL B is correspondingly constructed to PANEL A. PANEL B comprises a purge line 32 coupled with the purge gas source 34 via line 31 joined to purge line 30, as shown. The purge gas source 34 as mentioned may comprise a cylinder or other supply container having a suitable purge gas therein. The purge gas source 34 supplies purge gas that is selectively flowable through the purge line 32.

Alternatively, the purge gas source 34 instead of being a single source from which purge gas is selectively dispensable to each of the purge lines 30 and 32 in sequence, may otherwise comprise separate purge gas sources associated directly with each of the respective PANELS A and B. With such separate purge gas sources, the purge gas line 32 in PANEL B would be configured analogously to purge gas line 30 in PANEL A, and may include a restricted flow orifice and optional particle filter as shown for the purge gas line 30 in PANEL A.

The purge line 32 contains automatic valve AV-11. The PANEL B main gas flow line 28 interconnects the process gas discharge manifold line 18 with the sub-atmospheric pressure gas supply vessel 16, as well as the purge gas manifold line 20.

The main gas flow line 28 is coupled to the supply vessel 16 by a valve head assembly including a valve AV-10. The main gas flow line 28 contains a pressure transducer PT-2 automatic valve AV-12, pressure-controlled flow regulating device FR-2, and automatic valve AV-14. Line 28 also is provided with optional by-pass flow control loop 46 containing automatic valve AV-15.

Purge gas manifold line 20 interconnects the main gas flow lines 26 and 28 as shown. Automatic valves AV-03 and AV-13 are provided in the PANEL A and PANEL B segments of the purge gas manifold line 20, respectively. The purge gas manifold line 20 in turn is joined to purge gas discharge line 24 containing scrubber unit 42. The scrubber unit 42 may comprise an in-line canister containing a suitable chemisorbent or scavenger material which effects removal from the purge gas of process gas component(s) to yield a process gas-depleted purge effluent that is flowed in line 50 to the venturi purge gas pump 40.

The venturi purge gas pump 40 receives drive gas from drive gas source 60 via drive gas feed line 62 containing flow control valve 64 therein. From the venturi purge gas pump 40, the process gas-depleted purge effluent is exhausted from the gas cabinet 12 in purge gas discharge line 66. The process gas-depleted purge effluent may be sent to exhaust from the system, recycled in the system, and/or treated in whole or part, as necessary or desirable in a given application.

The isolation valves, automatic valves AV-03 and AV-13, isolate the venturi purge gas pump 40 from the panels' evacuation circuitry. The individual panels allow for local pump purging, local evacuation, and isolated cylinder changing.

The process delivery lines comprise indicating pressure transducers (PT-1 in PANEL A; PT-2 in PANEL B) at each cylinder (supply vessel 14 for PANEL A; supply vessel 16 for PANEL B), high flow, i.e., high CV, valves (AV-00 for supply vessel 14; AV-10 for supply vessel 16), and downstream pressure control devices (AV-2, FR-1 and AV-4 in PANEL A; AV-12, FR-2 and AV-14 in PANEL B), including optional bypass loops (loop 44 containing AV-05 in PANEL A; loop 46 containing AV-15 in PANEL B).

The flow control devices FR-1 and FR-2 are used to ensure a smooth transition during switching from empty to full sub-atmospheric pressure cylinders in the respective PANELS A and B. That is, the flow control devices FR-1 and FR-2 prevent the pressure in the full cylinder from spiking the downstream delivery system and, thus, the process tool. The flow control devices FR-1 and FR-2 may each comprise a commercially available device such as the MKS 640 Series pressure controller (available from MKS Instruments, Inc.) or a pressure control assembly comprising a combination of a downstream pressure transducer, a variable setting (proportioning) control valve, and a PID controller, which may be included in the system's overall process control system. Preferred flow control devices include the Model SR-3 and Model SR-4 subatmospheric pressure regulators commercially available from Integrated Flow Systems, Inc. (Santa Cruz, Calif.), which may be selectively set at pressure settings, e.g., at a pressure in the range of from about 20 to about 50 Torr.

The sub-atmospheric pressure gas delivery system 10 may also comprise in the gas cabinet a central processing unit (CPU) 48, which may be operatively linked to the valves, controllers and actuators in the system, for control of such system components according to a cycle time control program or in other automatically controlled manner. The CPU may comprise a programmable computer, microprocessor, or other microelectronic unit for such purpose. Preferably, the CPU comprises a programmable logic controller (PLC).

The CPU alternatively may be situated outside of the cabinet 12 and operatively linked to the valves, controllers and actuators of the system in a suitable fashion, e.g., by signal transmission wires, wireless (e.g., infrared) link, etc.

In operation of the gas delivery system 10, PANEL A initially is in an "Operating" mode and PANEL B is in a "Stand-By" mode, and sub-atmospheric pressure cylinders 14 and 16 are connected to the respective PANEL A and PANEL B assemblies.

In PANEL A, gas from sub-atmospheric pressure supply cylinder 14 is flowed through the open valve AV-00 in main gas flow line 26, with valves AV-2 and AV-04 also being open, so that the supplied gas passes into process gas discharge manifold line 18 and is discharged from the gas cabinet 12 into process gas discharge flow line 22 for flow to the gas-consuming facility 38.

During such dispensing operation in PANEL A, the valves AV-1 and AV-3 are closed. The pressure transducer PT-1 monitors the pressure of the dispensed gas from sub-atmospheric pressure supply cylinder 14, and the monitored pressure is inputted to the CPU 48 for control purposes, while the pressure-controlled flow regulating device FR-1 controls the flow of the dispensed gas to the gas-consuming facility 38 in accordance with the requirements of the facility.

When sub-atmospheric pressure supply cylinder 14 connected to PANEL A approaches an empty condition, PANEL B is automatically readied under the control of the CPU 48 for switching. The empty and near-empty states of the sub-atmospheric pressure cylinders may be defined by the end-user by programming the CPU, or the respective empty and near-empty set points may be pre-set in the CPU as furnished to the end-user.

Readying PANEL B for switching entails performing purge and evacuation cycles and charging PANEL B with sub-atmospheric pressure gas. During these process steps, the pressure-controlled flow regulating device FR-2 will be fully closed using a direct digital signal from the CPU 48, e.g., by a system programmable logic controller (PLC) of such CPU.

In the purging of PANEL B, purge gas from the purge gas source 34 is flowed from line 31 into purge line 32 to the purge gas manifold line 20 and exhausted from the gas cabinet 12 in purge gas discharge line 24 under the action of the venturi pump 40. During the purge step, the valves AV-11, AV-13 and AV-20 are open, and valves AV-10, AV-12 and AV-14 are closed. The purge gas from source 34 is flowed in line 30 through the restricted flow orifice RFO-1 to prevent the occurrence of pressure surges and regulate the pressure drop in the purge flow circuit. Alternatively, the respective valves AV-11 and AV-13 can be toggle-sequenced, to selectively pressurize the corresponding segments of line 32 in PANEL B (or, correspondingly, valves AV-1 and AV-3 in the analogous sequence in PANEL A), followed by vacuum extraction of the purge gas from the line, in the purge operation.

In accordance with the invention, the purge gas displaces and entrains the residual process gas in the flow circuitry to form a purge effluent that in flowing through the scrubber unit 42 is contacted with the scrubber medium therein, to remove process gas, e.g., arsine in the illustrative example, from the purge effluent to yield process gas-depleted purge effluent that is flowed to the venturi pump 40 and exhausted as vent gas from the gas cabinet 12 in line 66.

After the purging step, the valve AV-11 is closed, and the purge flow circuit comprising purge gas discharge line 24 and purge gas manifold line 20 is evacuated under the continuing action of the venturi pump 40. After evacuation has been completed, the valves AV-13 and AV-20 are closed, and the gas dispensing circuitry of PANEL B (comprising main gas flow line 28) is refilled with process gas and brought to active dispensing condition.

To effect the refill of the gas dispensing circuitry of PANEL B for active dispensing, valve AV-14 is opened in main gas flow line 28 and the pressure transducer of the pressure-controlled flow regulating device FR-2 of PANEL B is exposed to the delivery line pressure, which is that of the sub-atmospheric pressure gas supply vessel 14 that is connected to PANEL A and still in the active dispensing mode.

When the pressure in the product discharge flow line 22 reaches the lower or "empty" setpoint, as sensed by the pressure transducer of the pressure-controlled flow regulating device FR-2 of PANEL B, then valves AV-10 and AV-12 of PANEL B open. At this point, the digital signal that closes the pressure-controlled flow regulating device FR-2 control valve is terminated, and the pressure-controlled flow regulating device FR-2 begins operating to keep the pressure of PANEL B within 10 Torr above that of PANEL A. Simultaneously, valves AV-2 and AV-4 in PANEL A close and a pump/purge cycle begins to remove residual process gas from PANEL A.

The pressure-controlled flow regulating device FR-2 slowly opens its proportioning control valve to a "fully open" state in a manner such that the rate of rise of process gas in the delivery line is less than 20 Torr/minute, which is the rate that most mass flow controllers (MFCs) can withstand without compromising flow stability.

Once the delivery line pressure at the pressure-controlled flow regulating device FR-2 equals that of the sub-atmospheric pressure gas supply vessel 16 as determined by pressure transducer PT-2, the pressure-controlled flow regulating device FR-2 can be fully opened to provide unrestricted flow.

At this point, PANEL A is "off-line" (inactive with respect to dispensing of process gas) and may undergo the purging/evacuation and fill sequence described hereinabove for PANEL B. PANEL B during such purging/evacuation and fill sequence of PANEL A continues to dispense process gas.

With valve AV-00 in PANEL A being closed during the purging/evacuation and fill sequence in such panel, the "used" sub-atmospheric pressure gas supply vessel 14 in PANEL A can be changed out—i.e., removed and replaced by a fresh (full) sub-atmospheric pressure gas supply vessel, for subsequent renewed operation of PANEL A as the active gas dispensing panel of the gas delivery system when the sub-atmospheric pressure gas supply vessel in PANEL B is exhausted, and the aforementioned auto-switching procedure is carried out.

It is preferred to avoid the use of the pressure-controlled flow regulating device FR-2 as a fixed regulator, in order to provide the end-user with the capability to employ a mass flow controller (MFC) in the gas-consuming facility 38 as a measure of the remaining process gas in the sub-atmospheric pressure gas supply vessel that is supplying process gas to the facility. The end-user may for example record the MFC's valve voltage reading and use such valve voltage reading as the measure of the approach to the sub-atmospheric pressure gas supply vessel's "empty" state. The MFC valve voltage increases proportionally with decreasing pressure in the sub-atmospheric pressure gas supply vessel, and it is preferred from an MFC accuracy standpoint to operate at higher base pressures, e.g., >20 Torr.

Although the FIG. 1 embodiment of the invention has been illustratively shown and described with reference to a gas delivery system utilizing two gas panels (PANEL A and PANEL B), it will be appreciated that the invention is not limited in such respect, and that more than two gas panels may be employed in a given end use application of the present invention, wherein each panel undergoes the cycle steps just described (active gas dispensing, purge, evacuation and fill transition to dispensing condition), in a sequence that is automatically switched with respect to the constituent gas panels.

The gas delivery system of FIG. 1 permits continuous dispensing operation to take place, with one of the multiple gas panels being an active dispensing panel, and the other(s) being purged, evacuated and fill transitioned in sequence. The process gas can be of any suitable type, including hydride gases, halide gases and organometallic gases, in applications involving semiconductor manufacturing.

In accordance with the invention, the purge effluent comprising the purge gas and residual process gas from the flow circuitry of the gas cabinet is contacted with the dry scrubbing medium to at least partially remove the residual process gas and yield a process gas-depleted purge effluent that is amenable to being discharged as vent gas, e.g., to the house exhaust system of a semiconductor manufacturing facility.

It will be appreciated that the dry scrubbing treatment of the purge effluent to remove the process gas therefrom embodies a highly efficient manner of abatement of the residual or "hold-up" process gas remaining in the flow circuitry of the gas cabinet, subsequent to termination of active dispensing operation involving a given gas supply vessel. Such dry scrubbing treatment is vastly more efficient than the alternative of a dedicated scrubber unit handling the entire volumetric flow of the vent gas from line 66, since the high volumetric flow rate of venturi drive gas would make the dedicated scrubber unit extremely large in size and bed volume (of dry scrubber medium) in relation to the simple in-line canister unit 42 shown in the illustrative embodiment of FIG. 1.

The auto-switching of the gas supply vessels described hereinabove prevents large pressure waves from being propagated through the delivery line as a result of auto-switching between empty and full sub-atmospheric pressure cylinders. Such auto-switching system ensures continuous delivery of sub-atmospheric pressure gas in applications in which fungible sub-atmospheric pressure gas cylinders may be stockpiled to provide a cylinder inventory from which a fresh cylinder may be readily installed during the change-out for a given gas panel.

Additionally, the operation of the gas delivery system in the manner described, above prevents the occurrence of pressure spikes during the auto-switch operation and thereby serves to minimize particle shedding from individual system components. As a result, the purity of the gas dispensed by the gas delivery system is maintained at a high level, as is necessary in gas-consuming operations such as semiconductor manufacturing, in which deviations from the set point purity level may yield a semiconductor product that is defective or even useless for its intended purpose.

Figure 2:
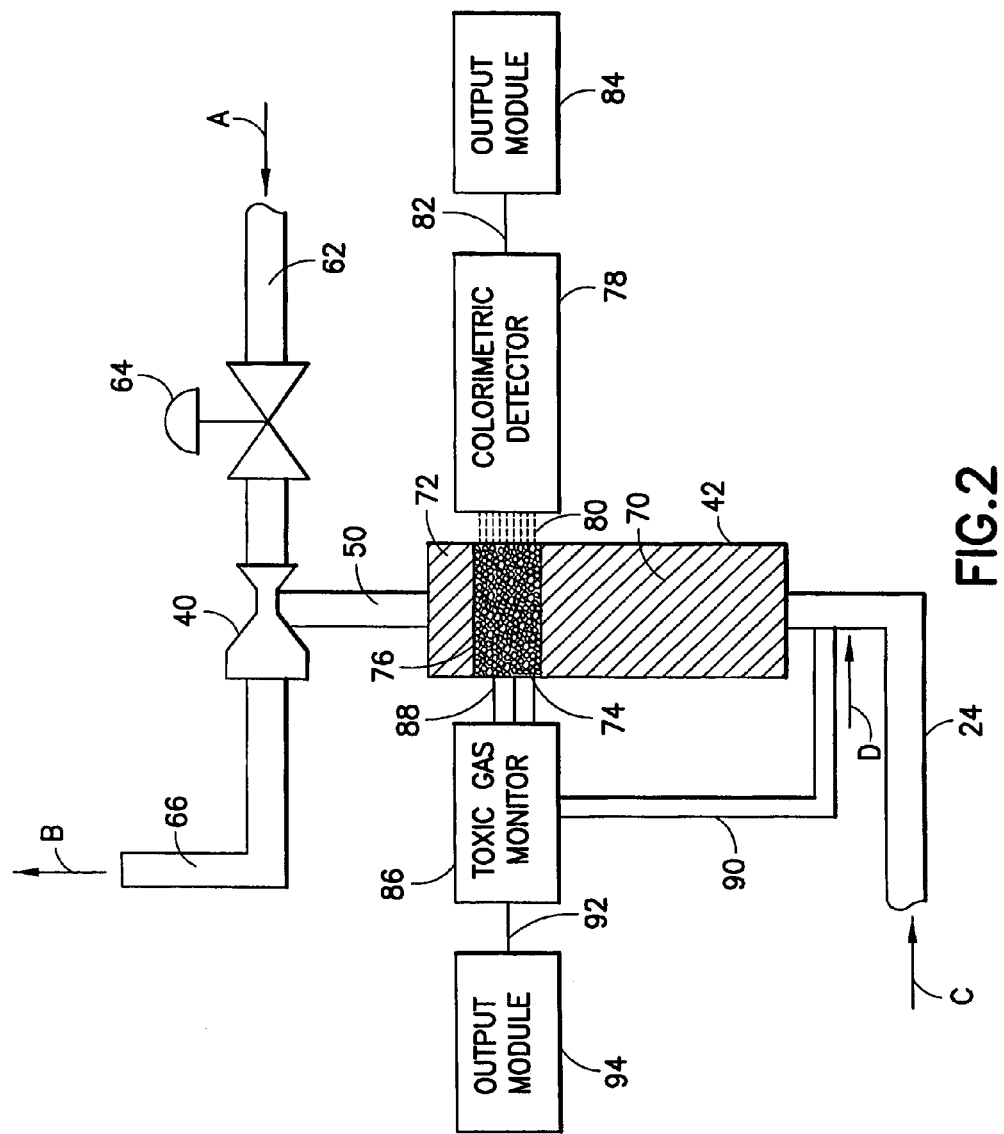
FIG. 2 is a schematic representation of a modified integrated cyclic purge scrubber according to another embodiment of the invention.

FIG. 2 is a schematic representation of a modified integrated cyclic purge scrubber according to another embodiment of the invention. In the FIG. 2 embodiment, the elements of the illustrated apparatus that generally correspond to those described above with reference to FIG. 1 are correspondingly numbered to the elements of FIG. 1.

FIG. 2 shows the purge effluent flow circuitry as including purge effluent line 24, in which the purge effluent is flowed in the direction schematically indicated by arrow C, into the scrubber unit 42. The scrubber unit 42 includes a vessel containing dry scrubbing medium, which in the specific embodiment of FIG. 2 is arranged as two fixed beds 70 and 72. The dry scrubbing medium for such deployment is suitable in the form of a finely divided solid, e.g., in the form of pellets, spheres, or other geometrically regular or irregular shape, which provides a bed containing sufficient void volume for flow through the bed of the purge gas to effect removal of the process gas species therefrom.

The dry scrubber medium in beds 70 and 72 may be of any suitable type appropriate to the particular process gas for which the abatement of the toxic or otherwise hazardous or undesirable species therefrom is to be conducted. The choice of a specific dry scrubbing medium is within the skill of the art, given the disclosure herein and the existence of a wide variety of sorbent and chemisorbent materials of suitable sorptive specificity for the process gas, as known to such skilled artisans in the field of the present invention.

The purge effluent thus enters the dry scrubbing unit 42 and flows through the fixed bed material therein, and is discharged in process gas-depleted purge effluent discharge line 50 to the venturi pump 40. Drive gas, e.g., clean dry air (CDA), or other drive gas medium, is flowed to the venturi pump 40 in the direction indicated by arrow A through drive gas feed line 62 containing flow control valve 64. The flow control valve 64 may be an automatically actuated valve that is coupled by suitable signal transmission line and actuator elements to a CPU such as that shown in FIG. 1, to modulate the flow of drive gas consistent with the vacuum requirements of the gas cabinet in the purging operation.

The drive gas mixes with the process gas-depleted purge effluent in the throat of the venturi pump 40 to form a vent gas that is discharged from the venturi pump 40 in vent line 66, flowing in the direction indicated by arrow B.

The dry scrubbing unit 42 in the FIG. 2 embodiment is fabricated with the vessel containing the dry scrubbing medium having a window 74 depicted at the upper end portion of the upstanding vessel in the view shown in FIG. 2. The window may be of a full 360° arc length circumferential extent, or alternatively may be constituted by a porthole or local viewport in the vessel wall. The windowed portion of the vessel is generally aligned with a colorimetric medium 76 forming a fixed bed between the lower bed 70 and upper bed 72 of dry scrubbing medium. The colorimetric medium thus is interiorly disposed in the vessel housing of the scrubber unit.

The colorimetric medium 76 is of any suitable type that in exposure to one or more target species of the process gas undergoes a color change that is visually discernable by observation through the window 74 of the chamber. The colorimetric medium may be constituted by the dry scrubbing medium itself, or by a colorimetric medium other than the dry scrubbing medium. The colorimetric medium reacts with the target gaseous species and changes color. Such calorimetric (color-changing) response to the target gas species indicates when the scrubber is approaching exhaustion, i.e., fully consumed status with respect to the dry scrubber medium in the vessel, such that the scrubbing medium needs to be changed out and fresh scrubbing medium charged to the scrubbing vessel.

Examples of calorimetric media that may be employed in the broad practice of the present invention, in specific embodiments, include, in the case of acid gases as target species, iron oxide, calcium hydroxide, copper sulfate, copper hydroxide, copper carbonate and the like.

The colorimetric medium may be based on any suitable chemistry with respect to the particular target gas species involved.

As a further alternative, the active colorimetric chemistry may be coated on adsorbent solids that function as a carrier or substrate for the colorimetric indicating medium. The adsorbent solid substrate may comprise a material such as molecular sieve, silica, alumina, clays, macroreticulate polymers, etc., in any suitable form, e.g., finely divided or discontinuous forms such as pellets, rings, particles, extruded geometric (regular or irregular) shapes, etc.

In use, the calorimetric medium as suitably packaged or presented is suitably disposed in viewable proximity to the window of the scrubbing vessel, where contact of the calorimetric medium with the target species of interest will produce a color change that is visually observable at the window.

When the purge effluent includes hydride gas as the target species being abated by the fixed bed of dry scrubber material, and such target species breaks through at the location of the colorimetric indicator, e.g., 90% of the axial distance through the bed, as measured from the inlet end of the bed, the axial direction being the direction of gas flow through the bed, the break-through hydride gas(es) will react with the colorimetric chemical, e.g., $CuSO_4$, turning from pale blue to black, thereby providing an indication that the bed has been spent.

Monitoring of the colorimetric medium for such color change can be performed either manually (visually) or using spectroscopic methods.

In general, any suitable colorimetric chemistry can be employed that is effective to produce a color change in exposure to the target gas species.

If the process gas contains more than one toxic or otherwise hazardous gas species, the detection of more than a single species of target gas is required, and the detection of multiple families of gases (e.g., multiple acid gases, multiple hydride gases, or one or more gas species of different gas families, such as acid gases and hydride gases, or hydride gases and fluorine-containing gaseous compounds, or other disparate gas species) is then accommodated by a calorimetric medium that is colorimetrically indicative for any of the target species, or by multiple colorimetrically indicative media.

Concerning color chemistries applicable to such multi-species detectors, chemistries such as copper sulfate and copper carbonate can be used for detecting hydride species such as arsine. For detection of acid gas species, materials such as iron oxide, pH indicating solutions, copper carbonate, copper hydroxide, etc., are usefully employed.

Considering process applications of such multi-species detectors, in ion implantation, three main gases are conventionally used that require effluent treatment—arsine, phosphine and boron trifluoride. A copper sulfate detector is effective to indicate the presence of hydride gases but will not change color in contact with boron trifluoride or its by-product hydrogen fluoride. The iron oxide chemistry or other acid gas indicator will detect the fluoride gases, but not hydride species.

In order to accommodate such limitations of individual chemistries, multiple chemistries are usefully employed. In one illustrative embodiment, copper sulfate is employed for detection of hydride gases and a pH indicator (e.g., cresol red) is utilized for the detection of acid gases. Such $CuSO_4$/cresol red combination is useful for many ion implant applications. Other colorimetric chemistry combinations include copper sulfate with any other pH indicator, copper carbonate with a pH indicator, copper hydroxide with a pH indicator, etc. Common pH indicators include cresol red, methyl red and crystal violet.

As an alternative means of detecting multiple target gas species, a "split-window" technique may be employed, involving physical separation of the respective chemistries for the respective ones of the multiple species being monitored. For example, a hydride detection chemistry such as copper sulfate, and a pH indicator, may be used in combination so that different portions of a support are devoted to different chemistries. Such approach is usefully employed in the case of chemistries that cannot be mixed with one another.

In other instances, the colorimetric chemistries for the multiple components can be mixed with one another on the support medium, and the constituent color changes can be monitored, against-calibration or correlation standards that permit the specific components breaking through to be established. This may be advantageous, for example, in instances where the breakthrough of one species is independent from the breakthrough of another.

When the color change indicative of the presence of the target gas species occurs, the color change is detected in any suitable manner, e.g., by visual inspection through window 74, or, more preferably, by an optical sensor, shown schematically as colorimetric detector 78 in FIG. 2, arranged to detect a calorimetric change involving optical signal 80. Many models of optical sensors are commercially available, and usefully employed in the broad practice of the present invention (e.g., MDA sensors, commercially available from Zellweger Analytics, Inc. (Lincolnshire, Ill.), and sensors commercially available under the trademarks ISA and SPECTRUM from Enmet Corporation (Ann Arbor, Mich.)). The sensor is suitably positioned for monitoring the color change of the indicating medium 76, and coupled in signal-transmission relationship via signal transmission line 82 to an output module 84.

The output module 84 can be of any suitable type, operable for generating a recorded or otherwise perceivable indicating output reflecting the presence of the target species contacting the colorimetric medium 76. Under "normal" conditions (absence of target species in the gas contacted with the indicating medium), the sensor sends out a baseline signal. When the indicating medium changes color, the sensor's output signal will change as a result of the difference in the absorbance of light from the indicating element.

In one embodiment, when the sensor signal reaches a predetermined level, reflecting the presence of the target species in the gas being monitored, an alarm can be latched in associated circuitry in output module 84, to produce an alarm output indicative of chemical breakthrough of the target gas species.

As another variation for detection of breakthrough conditions, the scrubber unit 42 instead of a calorimetric medium and a windowed portion of the scrubber vessel, may feature a gas sampling line 88 in communication with an upper portion of the scrubber vessel's interior volume, for flowing sampled gas to a toxic gas monitor 86. The toxic gas monitor 86 is in turn coupled by signal transmission line 92 to output module 94. The output module 94 may be arranged to provide a real-time monitoring capability, and to output data and/or an alarm when the target gas species in the purge effluent is detected.

The toxic gas monitor may also be coupled by means of a CPU or other control unit to switch the purge effluent to another scrubbing vessel, e.g., by a manifolded arrangement of multiple canister scrubber units, in which the manifolding is valved to allow switching of the purge effluent stream from one canister to another upon breakthrough conditions being sensed by the toxic gas monitor.

The toxic gas monitor is also arranged as a flow-through unit, with sampled gas from the detector being recycled via the recirculation line 90 (flow in the direction indicated by arrow D) to the purge effluent line 24 for return to the inlet of the bed of scrubbing medium in scrubbing unit 42.

As yet another variation of the scrubber arrangement, a programmable logic controller (PLC) can be employed to count the number of purge cycles, or the number of gas supply vessel changes, and to responsively produce an output indicating the need to change out the purge effluent scrubber canister. The output may be an audible alarm, or a visual display or warning of the approach to exhaustion of the purge effluent scrubbing medium.

For example, referring to the gas delivery system of FIG. 1, the PLC logic is encompassed by the CPU 48, and may be programmably arranged to count the number of cylinder changes in the gas delivery system.

Thus, as one gas supply cylinder in the gas cabinet, e.g., cylinder 14 associated with Panel A, approaches exhaustion, the autoswitching procedure is effected by the CPU to isolate the depleted cylinder 14 and to switch the active gas supply function to cylinder 16 associated with Panel B. This switchover is counted as a first change event by the programmable logic controller.

While the cylinder 14 is isolated, it is uncoupled from the flow circuitry and is removed from the gas cabinet and replaced by a fresh gas supply cylinder (replacement cylinder 14). Subsequently, as continuing gas delivery from the on-stream cylinder 16 progressively diminishes the fluid in the cylinder, cylinder 16 becomes depleted, and the autoswitching procedure again is effected by the CPU to isolate the depleted cylinder 16 and to switch the active gas supply function to the replacement cylinder 14. This switchover is counted as a second change event by the programmable logic controller.

The gas delivery process continues, with the number of changes of gas supply vessels being continuingly monitored. During each switchover, the remaining hold-up process gas in the flow circuitry is purged out and flowed to the scrubber 42 for removal of the process gas, e.g., arsine, from the purge effluent.

Accordingly, during each switchover portion of the operating cycle, the scrubber 42 will contact an amount of process gas equal to the volume of piping in the flow circuitry that holds such process gas at the time of switching and is subsequently purged flow of purge gas through such piping, to generate the purge effluent that is flowed through the scrubber canister.

The PLC logic circuitry therefore can be suitably programmed to divide the scrubber capacity, C, in units of volume of process gas, e.g., $m^3$ of arsine, by the volume of tubing that is purged per change cycle, where V=volume of tubing containing hold-up process gas at termination of active dispensing from associated gas supply vessel that is processed by the scrubber in each change, e.g., in units of $m^3$ of arsine/change, to thereby calculate the number of change cycles, n, that can be accommodated by the scrubber as n=C/V.

The PLC logic circuitry can be deployed to provide the ultimate number of changes n before the scrubber must be changed out, as well as the current number of cumulative changes in operation of the gas delivery system, so that the progress toward scrubber exhaustion is quantitatively determinable. At the point that the number of changes reaches the exhaustion value, the PLC and associated CPU circuitry can operate to provide an output such as an audible alarm, a computer screen message, or other audible, visual, or other modality of warning that the scrubber medium requires replacement.

In a further variation of such PLC/CPU monitoring and control arrangement, the scrubber medium may be provided in two scrubber canisters that are manifolded together, by a valved manifold, so that only one is actively processing purge effluent at any given time. At the point that the number of changes reaches the exhaustion value for the on-stream one of the manifolded canisters, the valves in the manifold are actuated, to isolate the exhausted scrubber canister from receiving any additional purge effluent, and the purge effluent thereafter is flowed in the manifold to the other one of the canisters for continued removal of process gas components from the purge effluent stream.

It will be appreciated that the scrubber arrangement of the invention obviates the need for a vent gas scrubber that would process the entire vent gas stream from the gas cabinet (which due to the large volume of sweep gas flowed through the gas cabinet would entail an oversized and expensive scrubber installation), as well as avoiding the problems of false alarming that would result from directing the purge effluent into the ducting of a house exhaust system of the process facility in which the gas delivery system is employed.

The scrubber and venturi pump arrangement of the invention therefore embodies a simple and reliable capability for removing the process gas components from the purge effluent, in a manner consistent with the operational requirements of gas delivery systems in semiconductor manufacturing operations, and other industrial process applications.

Accordingly, while the invention has been described herein in reference to specific aspects, features and illustrative embodiments of the invention, it will be appreciated that the utility of the invention is not thus limited, but rather extends to and encompasses numerous other aspects, features and embodiments, as will readily suggest themselves to those of ordinary skill in the art, based on the disclosure herein. Accordingly, the claims hereafter set forth are intended to be correspondingly broadly construed, as including all such aspects, features and embodiments, within their spirit and scope.

What is claimed is:

1. A gas delivery process wherein process gas from a gas supply vessel is flowed through flow circuitry in a gas cabinet and dispensed from the gas cabinet, and the flow circuitry subsequent to process gas dispensing is purged with a purge gas to remove residual process gas from the flow circuitry and yield a purge effluent including the purge gas and residual process gas from the flow circuitry, said process comprising contacting the purge effluent with a dry scrubbing medium that is effective to remove the process gas from the purge effluent and yield a process gas-depleted purge effluent, and pumping the process gas-depleted purge effluent out of the gas cabinet with a venturi pump.

2. The process of claim 1, wherein the process gas dispensed from the gas cabinet is flowed to a semiconductor manufacturing tool.

3. The process of claim 1, wherein said gas supply vessel is one at least two gas supply vessels that are contained in the gas cabinet, and wherein each of said at least two gas supply vessels is arranged for dispensing operation, independent of the other(s).

4. The process of claim 3, wherein each of the at least two gas supply vessels is coupled with a corresponding gas panel, and each gas panel includes a portion of the flow circuitry.

5. The process of claim 3, further comprising monitoring the dry scrubbing medium to determine depletion of the dry scrubbing medium.

6. The process of claim 5, wherein said monitoring comprises detection of a colorimetric change indicative of depletion of the dry scrubbing medium.

7. A gas cabinet assembly for dispensing of gas to a process facility, said gas cabinet assembly comprising: a housing enclosing an interior volume configured for positioning of at least one process gas supply vessel therein; a discharge passage for flow of dispensed process gas out of the housing; flow circuitry in said interior volume, interconnecting said at least one gas supply vessel and said discharge passage, and arranged for flow of process gas dispensed from a said gas supply vessel to the discharge passage in a first mode of operation; a purge gas source coupled with the flow circuitry and arranged to flow purge gas through the flow circuitry to purge residual hold-up process gas from the flow circuitry in a second mode of operation subsequent to said first mode of operation, wherein the purge gas and residual hold-up process gas together form a purge effluent; a dry scrubber unit coupled with the flow circuitry to receive the purge effluent, said dry scrubber unit including a dry scrubbing medium arranged to sorptively remove process gas from the purge effluent and yield a process gas-depleted purge effluent; a venturi pump coupled with the dry scrubber unit to remove the process gas-depleted purge effluent from the dry scrubber unit; and an exhaust passage coupled with the venturi pump to discharge the process gas-depleted purge effluent from the housing.

8. The gas cabinet assembly of claim 7, wherein the discharge passage for flow of dispensed process gas out of the housing, is joined in process gas feed relationship to a semiconductor manufacturing tool.

9. The gas cabinet assembly of claim 8, wherein the semiconductor manufacturing tool includes an ion implanter or a chemical vapor deposition chamber.

10. The gas cabinet assembly of claim 7, further comprising at least one process gas supply vessel positioned in the interior volume of the housing.

11. The gas cabinet assembly of claim 10, wherein said at least one process gas supply vessel comprises a sub-atmospheric pressure gas supply vessel.

12. The gas cabinet assembly of claim 11, wherein the sub-atmospheric pressure gas supply vessel comprises a gas storage and dispensing vessel containing a solid-phase physical adsorbent having adsorbed thereon a gas for which the solid-phase physical adsorbent is physically adsorptive, as said process gas.

13. The gas cabinet assembly of claim 11, wherein the sub-atmospheric pressure gas supply vessel comprises a fluid storage and dispensing vessel containing a high pressure fluid, wherein the vessel comprises a gas flow regulator interiorly disposed therein, arranged for dispensing sub-atmospheric pressure process gas deriving from the high pressure fluid in the vessel.

14. The gas cabinet assembly of claim 7, further comprising at least two process gas supply vessels positioned in the interior volume of the housing, wherein each process gas supply vessel is arranged for independent dispensing operation.

15. The gas cabinet assembly of claim 7, further comprising a multiplicity of gas panels.

16. The gas cabinet assembly of claim 7, wherein the dry scrubber unit includes an endpoint detector for the dry scrubbing medium.

17. The gas cabinet assembly of claim 16, wherein the process gas comprises a gas species selected from the group consisting of hydride gases, halide gases and organometallic compound gases.

18. The gas cabinet assembly of claim 16, wherein the endpoint detector includes a toxic gas monitor coupled with the dry scrubbing unit to monitor purge effluent flowed through the dry scrubbing unit for the presence of unremoved process gas.

19. The gas cabinet assembly of claim 18, wherein the process gas comprises a gas species selected from the group consisting of hydride gases, halide gases and organometallic compound gases.

20. The gas cabinet assembly of claim 18, wherein the purge effluent monitored by the toxic gas monitor is recirculated to the dry scrubbing unit.

* * * * *